US009018433B2

(12) United States Patent
Wilson et al.

(10) Patent No.: US 9,018,433 B2
(45) Date of Patent: Apr. 28, 2015

(54) METHODS AND APPARATUSES FOR DIGESTING TISSUE

(75) Inventors: Joseph H. Wilson, Danville, IN (US); Lucas J. Wilson, Danville, IN (US); Samantha J. Sieber, Lafayette, IN (US); Mark A. Halsey, Indianapolis, IN (US)

(73) Assignee: Bio-Response Solutions, Inc., Danville, IN (US)

( * ) Notice: Subject to any disclaimer, the term of this patent is extended or adjusted under 35 U.S.C. 154(b) by 19 days.

(21) Appl. No.: 13/594,536

(22) Filed: Aug. 24, 2012

(65) Prior Publication Data

US 2013/0053615 A1 Feb. 28, 2013

Related U.S. Application Data

(60) Provisional application No. 61/527,336, filed on Aug. 25, 2011.

(51) Int. Cl.
G21F 9/14 (2006.01)
B09B 3/00 (2006.01)

(52) U.S. Cl.
CPC .................... B09B 3/0075 (2013.01)

(58) Field of Classification Search
USPC ......... 588/1, 18, 20, 313, 314, 318, 412, 900, 588/901; 422/184.1
See application file for complete search history.

(56) References Cited

U.S. PATENT DOCUMENTS

| | | | |
|---|---|---|---|
| 394,982 A | 12/1888 | Hobson | |
| 5,332,532 A | 7/1994 | Kaye et al. | |
| 5,534,162 A * | 7/1996 | Adams et al. | 210/781 |
| 6,437,211 B2 | 8/2002 | Kaye et al. | |
| 6,472,580 B2 | 10/2002 | Kaye et al. | |
| 7,183,453 B2 * | 2/2007 | Wilson et al. | 588/318 |
| 7,829,755 B2 | 11/2010 | Wilson et al. | |
| 7,910,788 B2 * | 3/2011 | Wilson et al. | 588/318 |
| 2001/0009969 A1 | 7/2001 | Kaye et al. | |
| 2001/0053869 A1 | 12/2001 | Kaye et al. | |
| 2003/0040651 A1 | 2/2003 | Wilson et al. | |
| 2004/0018112 A1 | 1/2004 | Wilson et al. | |
| 2004/0123637 A1 | 7/2004 | Rostrom | |
| 2006/0247485 A1 | 11/2006 | Wilson et al. | |
| 2007/0038013 A1 | 2/2007 | Wilson et al. | |
| 2007/0197852 A1 | 8/2007 | Wilson et al. | |
| 2009/0004714 A1 | 1/2009 | Norholm et al. | |
| 2009/0137858 A1 | 5/2009 | Wilson et al. | |
| 2011/0040138 A1 | 2/2011 | Wilson et al. | |
| 2011/0171073 A1 | 7/2011 | Wilson et al. | |
| 2013/0053615 A1 | 2/2013 | Wilson et al. | |

FOREIGN PATENT DOCUMENTS

| | | |
|---|---|---|
| AU | 2011245166 | 11/2014 |
| EP | 0936925 | 4/2009 |
| IN | 206718 | 3/2006 |
| JP | 10-028958 | 2/1998 |
| JP | 10-034118 | 2/1998 |
| JP | 2006-175310 | 7/2006 |
| JP | 2006-507940 | 9/2006 |
| WO | 9414169 | 6/1994 |
| WO | 9739777 | 10/1997 |
| WO | 0152907 | 7/2001 |
| WO | 02102420 | 12/2002 |
| WO | 2004091820 | 10/2004 |
| WO | 2006049625 | 5/2006 |
| WO | 2011/137351 | 11/2011 |

OTHER PUBLICATIONS

PCT Application No. PCT/US2011/034576, International Search Report and Written Opinion Jan. 11, 2012.
PCT Application No. PCT/US2011/034576, International Preliminary Report on Patentability Apr. 2, 2013.
Australian Patent Application No. 2011245166, Notice of Acceptance and Accepted Specification Apr. 29, 2014.
Japanese Patent Application No. 2013-508285, Office Action Sep. 2, 2014.

* cited by examiner

Primary Examiner — Edward Johnson
(74) Attorney, Agent, or Firm — Daniel L. Boots; Douglas G. Gallagher; Bingham Greenebaum Doll LLP

(57) ABSTRACT

Embodiments of this disclosure relate to tissue digestion and, more particularly, to methods and apparatuses for varying the number, size, and/or location of one or more tissue compartments within a digestive fluid vessel. Some examples include partitions that may be selectively positioned within a vessel (and may be selectively removable from the vessel) to create one or more tissue compartments. The partitions may be positioned, repositioned and rearranged within the vessel to form one or more tissue compartments. The partitions may be solid or include apertures, and may be oriented in horizontally and/or vertically. Alternate embodiments include one or more selectively closeable apertures that permit digestive fluid to circulate along alternate pathways, which can permit tissue digestion with reduced digestive fluid levels. Still further embodiments include baskets that are selectively positionable within the tissue digester. The baskets may also include one or more selectively positionable and/or repositionable partitions.

30 Claims, 16 Drawing Sheets

SECTION A-A

SECTION B-B

METHODS AND APPARATUSES FOR DIGESTING TISSUE

This application claims the benefit of U.S. Provisional Application No. 61/527,336, filed Aug. 25, 2011, the entirety of which is hereby incorporated herein by reference.

FIELD

Embodiments of this invention relate to tissue digestion and, more particularly, to a method and apparatus for quickly and safely digesting animal tissue.

BACKGROUND

Many institutions generate organic waste that requires proper disposal. For example, veterinary offices frequently require disposal of dead, and possibly diseased, animal carcasses. For many years burial and incineration (cremation) were the primary manners in which such tissue was disposed. In recent years tissue digesters have been increasingly used as an alternative to burial or incineration for the orderly disposition of tissue. Alkaline hydrolysis, which exposes the tissue to a strong alkaline (or base) solution, is a process used in many tissue digesters. Most, if not all, of the tissue is digested (dissolved) in the tissue digesters, and the dissolved tissue is then considered safe to discharge into the environment. The mineral ash of bones and teeth typically remain at the end of the process (approximately only five percent of the original weight and volume of a carcass or body), but is sterile and easily crushed into a powder that may be used as a soil additive or presented to the family in an urn in much the same way as ash from a crematory. Since most tissue disposal systems are large and expensive, veterinary offices and others in need of disposing of smaller animal bodies, such as typical household pets, would have to use outside disposal services for disposing of dead animals such as hiring an animal crematory.

SUMMARY

Embodiments of the present invention provide improved low-temperature alkaline hydrolysis tissue digestion methods and apparatuses.

In accordance with one preferred embodiment of the present invention, a tissue digester with adjustable internal tissue compartments and adjustable alkaline digestive fluid levels that digests tissue (e.g., carcasses and/or cadavers) is disclosed.

In some embodiments, an apparatus comprising a housing containing a fluid vessel for holding digestive fluid; a wall positioned within the fluid vessel, the wall partially separating the fluid vessel into a pump intake plenum and a tissue compartment; the fluid vessel having a bottom area shared between the pump intake plenum and the tissue compartment, the bottom area permitting fluid communication between the pump intake plenum and the tissue compartment, and an upper opening permitting fluid communication between the pump intake plenum and the tissue compartment; and one or more substantially horizontal platforms positioned within the tissue compartment is disclosed.

In certain embodiments, the wall includes at least one intermediate opening permitting fluid communication between the pump intake plenum and the tissue compartment. In further embodiments, the apparatus also includes a baffle configured to selectively block one of the at least one intermediate opening.

In select embodiments, the disclosed apparatus further comprises a fluid pump operatively coupled to the housing and disposed in the pump intake plenum. In some embodiments, the fluid pump is arranged to circulate fluid between the pump intake plenum and the tissue compartment.

In further embodiments, the one or more substantially horizontal platforms are configured to permit vertical fluid flow within the tissue compartment. In some embodiments, the apparatus further includes one or more platform supports arranged to support each of the one or more substantially horizontal platforms within the tissue compartment.

In some embodiments, the disclosed apparatus includes one or more vertical separators positioned within the tissue compartment, the vertical separators dividing the tissue compartment into a plurality of sub-compartments.

In certain embodiments, the disclosed apparatus further comprises a heater operatively coupled to the housing, the heater including a heating element disposed in fluid vessel. In further embodiments, the housing further comprises a discharge port in fluid communication with the fluid vessel, the discharge port controlled by a drain valve, and an access panel providing access to the drain valve. In select embodiments, the disclosed apparatus also includes a control box operatively coupled to the housing.

In some embodiments, a method for digesting tissue comprising providing a tissue digester, the tissue digester including a fluid vessel; loading tissue onto a substantially horizontal platform within a tissue compartment within the fluid vessel; adding digestive fluid to the fluid vessel; engaging a fluid pump disposed in the fluid vessel; and digesting the tissue is disclosed.

In further embodiments of the method, the step of loading tissue onto a substantially horizontal platform includes the further steps of inserting an additional substantially horizontal platform into the tissue compartment, the tissue compartment partially separated by a wall from a pump intake plenum within the fluid vessel; and unblocking a selectively blockable opening in the wall.

In some embodiments of the method, the step of loading tissue onto a substantially horizontal platform includes the further steps of inserting an additional substantially horizontal platform into the tissue compartment, the tissue compartment partially separated by a wall from a pump intake plenum within the fluid vessel; blocking a selectively blockable opening in the wall; and loading tissue onto the additional substantially horizontal platform.

In certain embodiments of the method, the step of loading tissue onto a substantially horizontal platform includes the steps of: placing one or more vertical separators within the tissue compartment, thereby separating the tissue compartment into a plurality of sub-compartments; and loading tissue into one or more of the sub-compartments. In certain embodiments of the method, this step includes a further step of inserting an additional substantially horizontal platform into the tissue compartment, the one or more vertical separators registering with a vertical wall engagement location on at least one of the substantially horizontal platform and the additional substantially horizontal platform.

In further embodiments of the method, the step of digesting the tissue includes the step of maintaining the temperature of the digestive fluid at a predetermined temperature. In some embodiments, this step includes disposing a heating element in the fluid vessel.

In certain embodiments, the disclosed method includes the subsequent step of draining the digestive fluid from the fluid vessel through a discharge port in fluid communication with the fluid vessel.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not intended to address every object described herein, and each embodiment does not necessarily include each feature described. Other forms, embodiments, objects, advantages, benefits, features, and aspects of the present invention will become apparent to one of skill in the art from the detailed description and drawings contained herein. The various apparatuses and methods described in this summary section, as well as elsewhere in this application, can be expressed as a large number of different combinations and sub-combinations. All such useful, novel, and inventive combinations and sub-combinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example only, and shall not to be construed as limiting.

DETAILED DESCRIPTION OF THE ILLUSTRATED EMBODIMENTS

Figure 1:
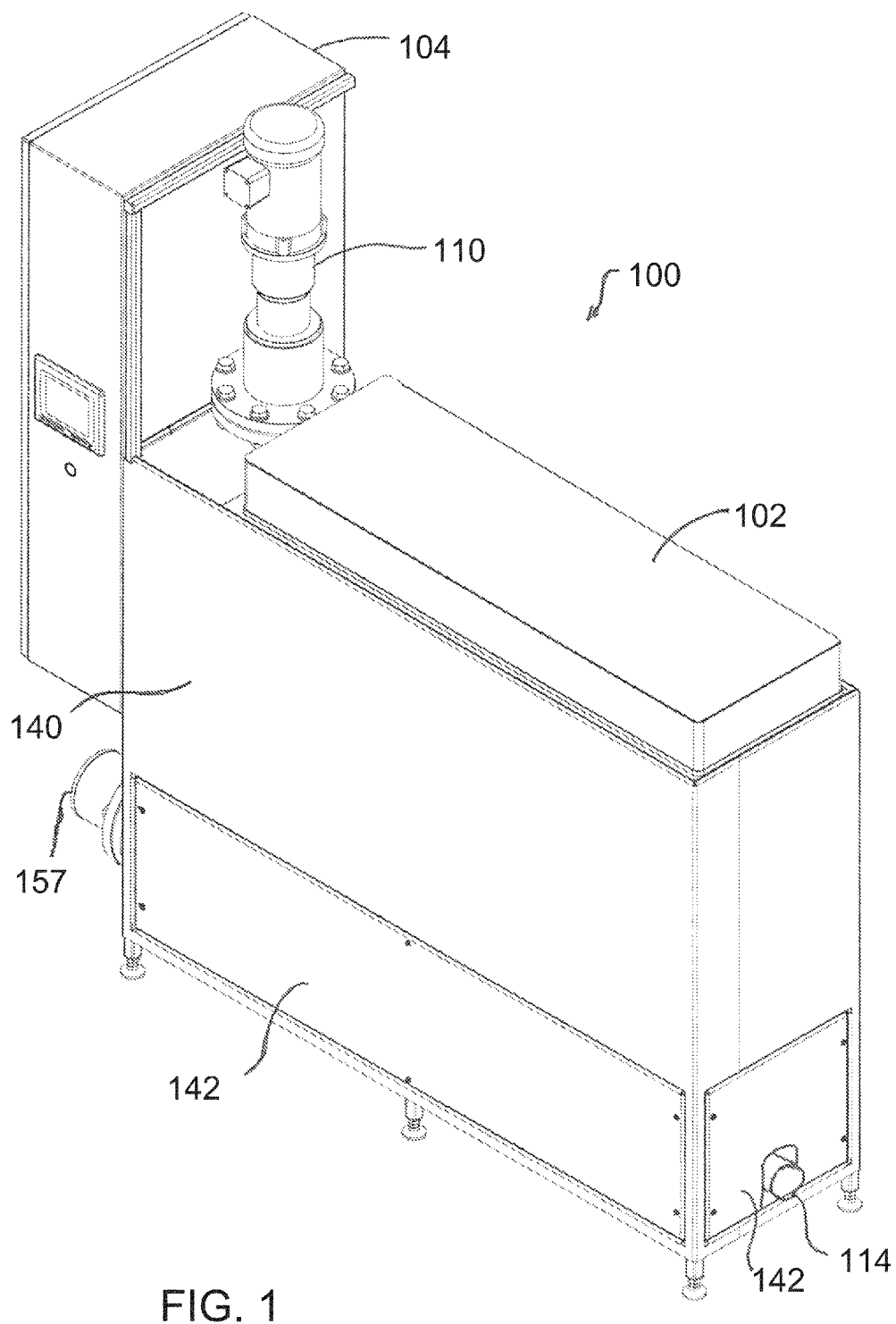
FIG. 1 is a perspective view of a tissue digester according to one embodiment of the present disclosure.
Figure 2:
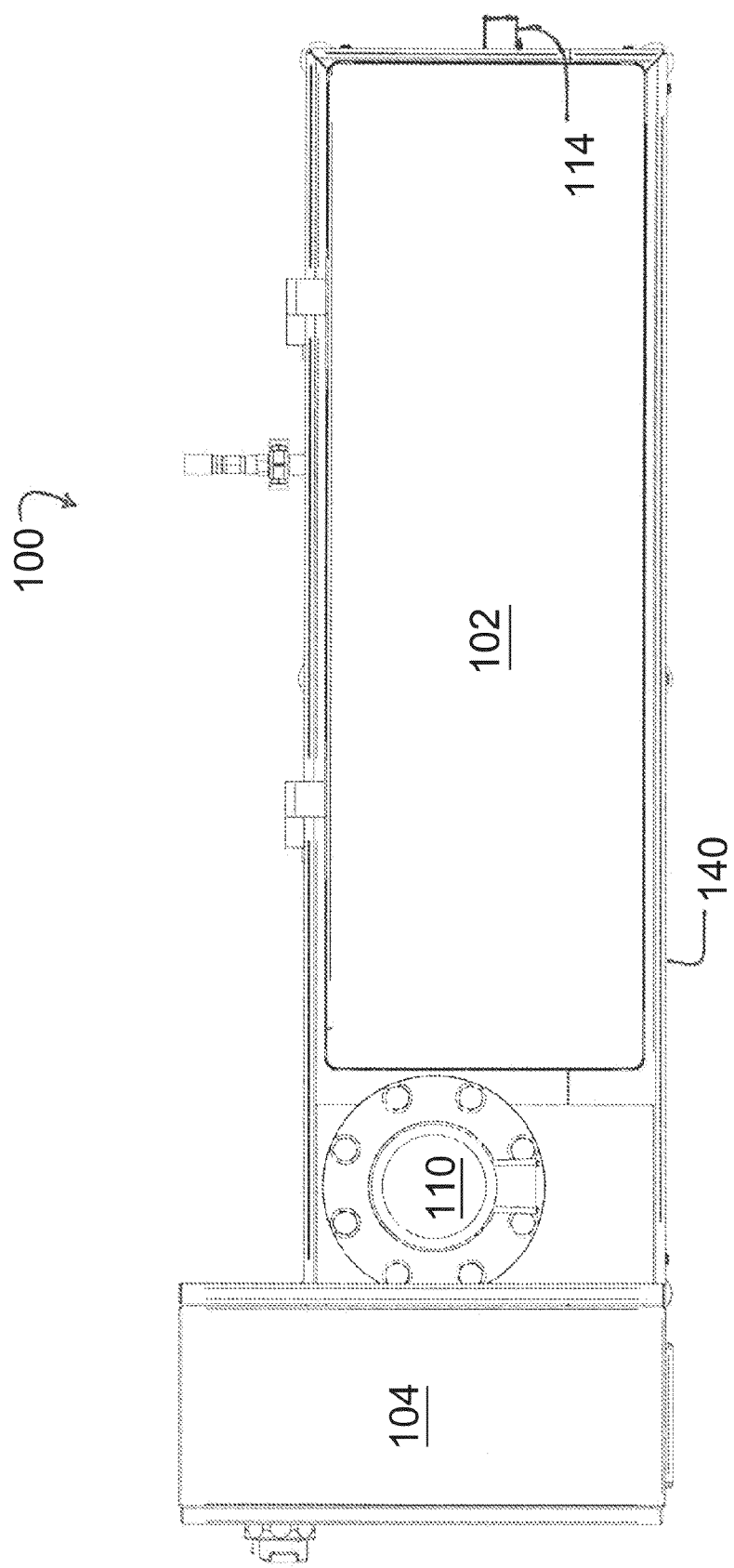
FIG. 2 is a top plan view of the tissue digester depicted in FIG. 1.
Figure 3:
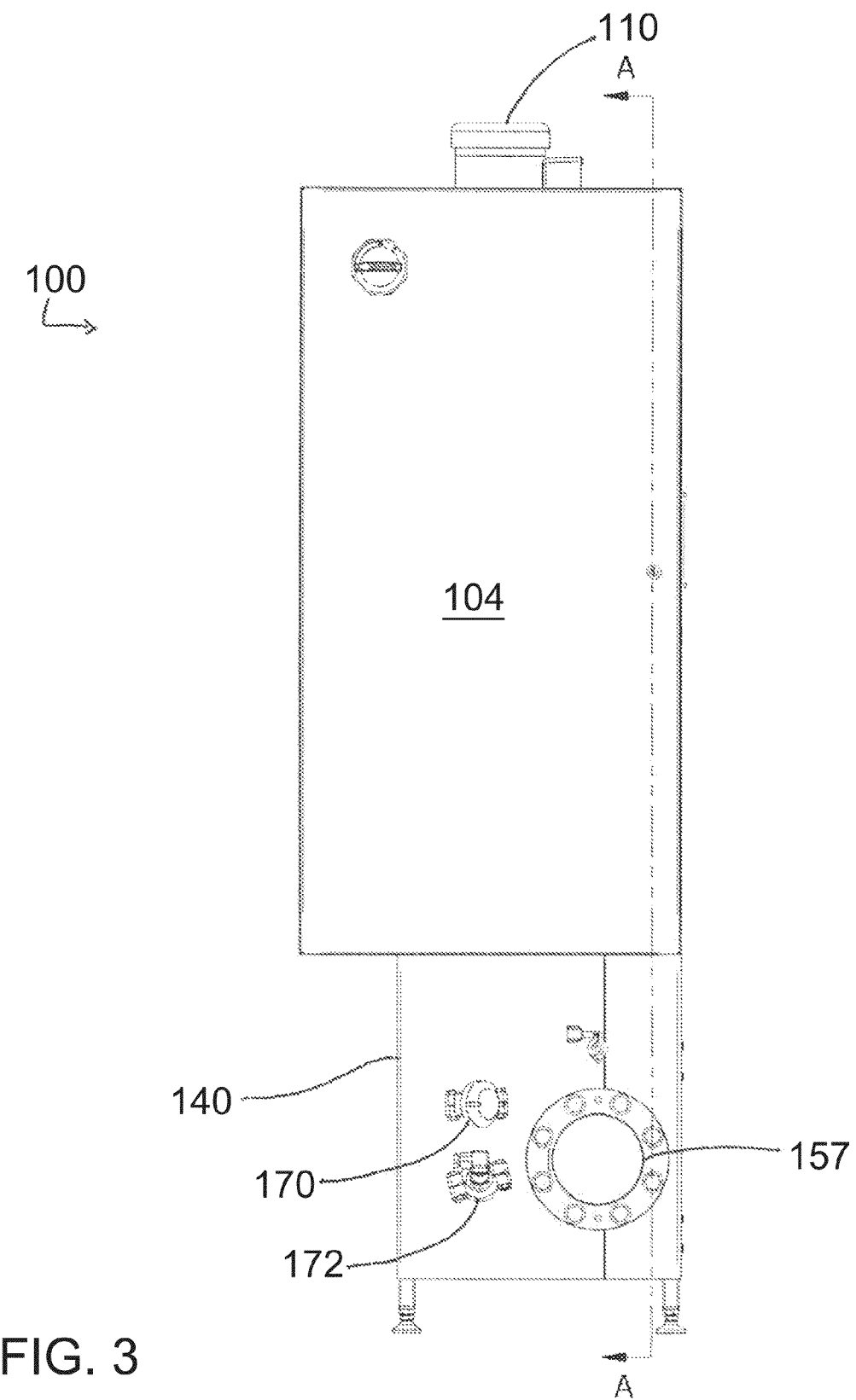
FIG. 3 is a side elevation view of the tissue digester depicted in FIG. 1.
Figure 4:
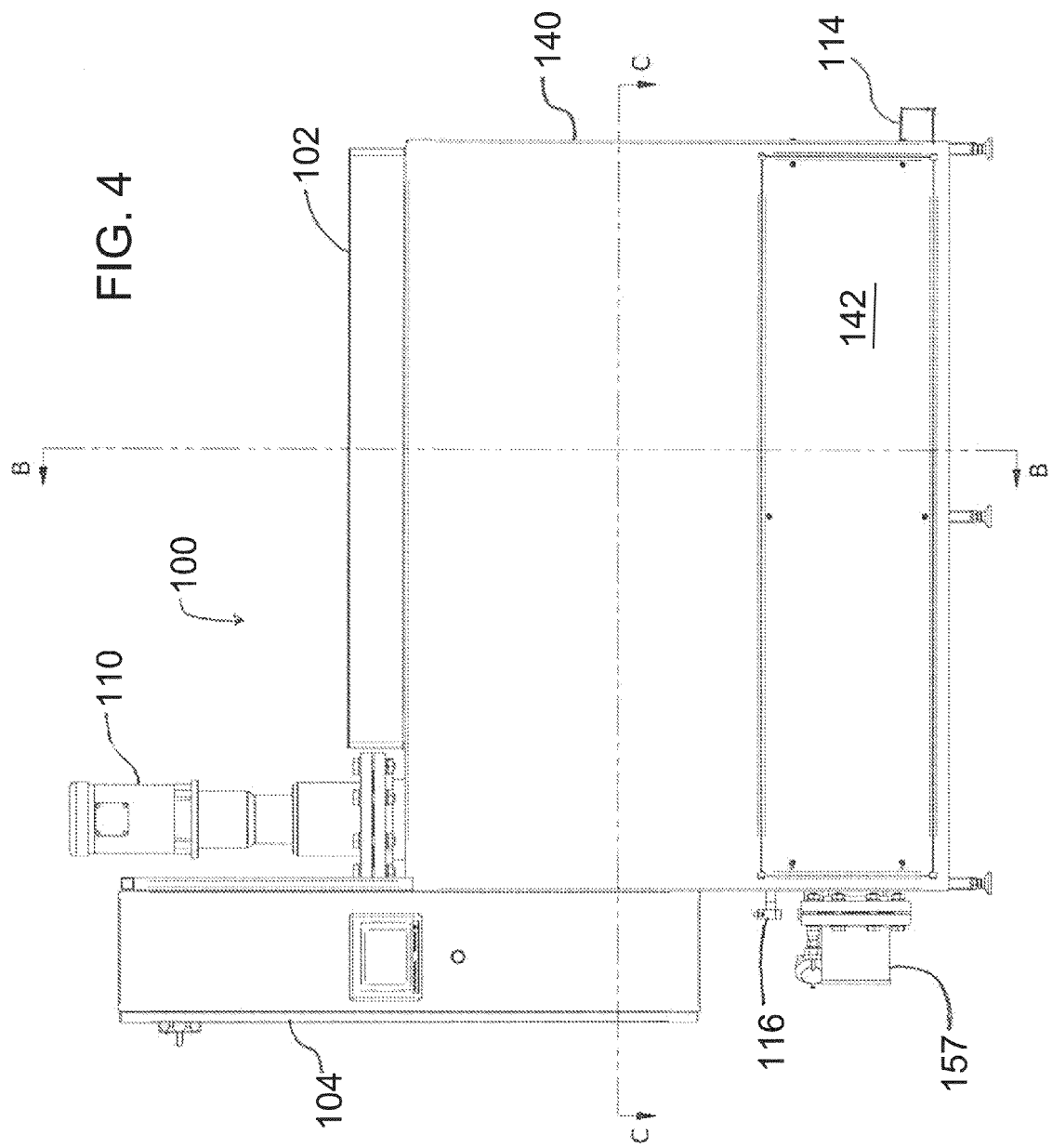
FIG. 4 is a front elevation view of the tissue digester depicted in FIG. 1.

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Any reference to "the invention" herein is a reference to an embodiment of a family of inventions, with no single embodiment including features that are necessarily included in all embodiments, unless otherwise stated. Further, although there may be references to "advantages" provided by some embodiments of the present invention, it is understood that other embodiments may not include those same advantages, or may include different advantages. Any advantages described herein are not to be construed as limiting to any of the claims.

Although specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter are presented as examples only and do not limit the applicability of other compositions of matter, especially other compositions of matter with similar properties, unless otherwise specifically indicated.

Depicted in FIGS. 1-10 is a tissue digester 100 according to one embodiment of the present disclosure. Referring to FIGS. 1-4, tissue digester 100 includes a digesting housing 140, a lid 102 (which covers the top of digesting housing 140 when in a closed position), fluid circulation member (for example, pump 112), and a control box 104. Digesting housing 140 includes one or more access panels 142 that may be removed to provide access to various components of tissue digester 100. Tissue digester 100 further includes discharge port 114 for draining tissue and fluid from within tissue digester 100 and an optional heater 157 for heating the digestive fluid.

Figure 5:
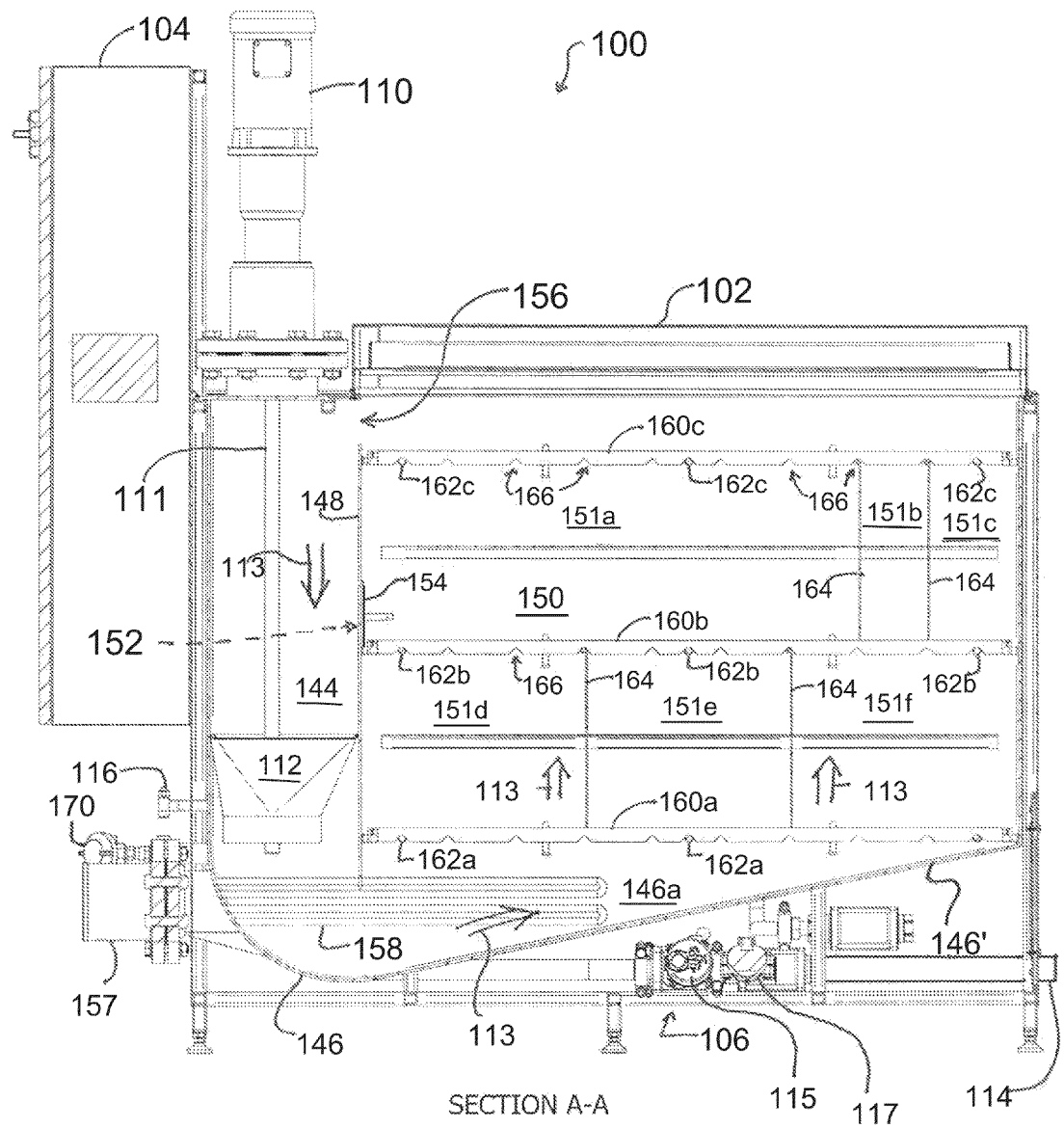
FIG. 5 is a front sectional view of the tissue digester depicted in FIG. 3 as viewed along line A-A.
Figure 6:
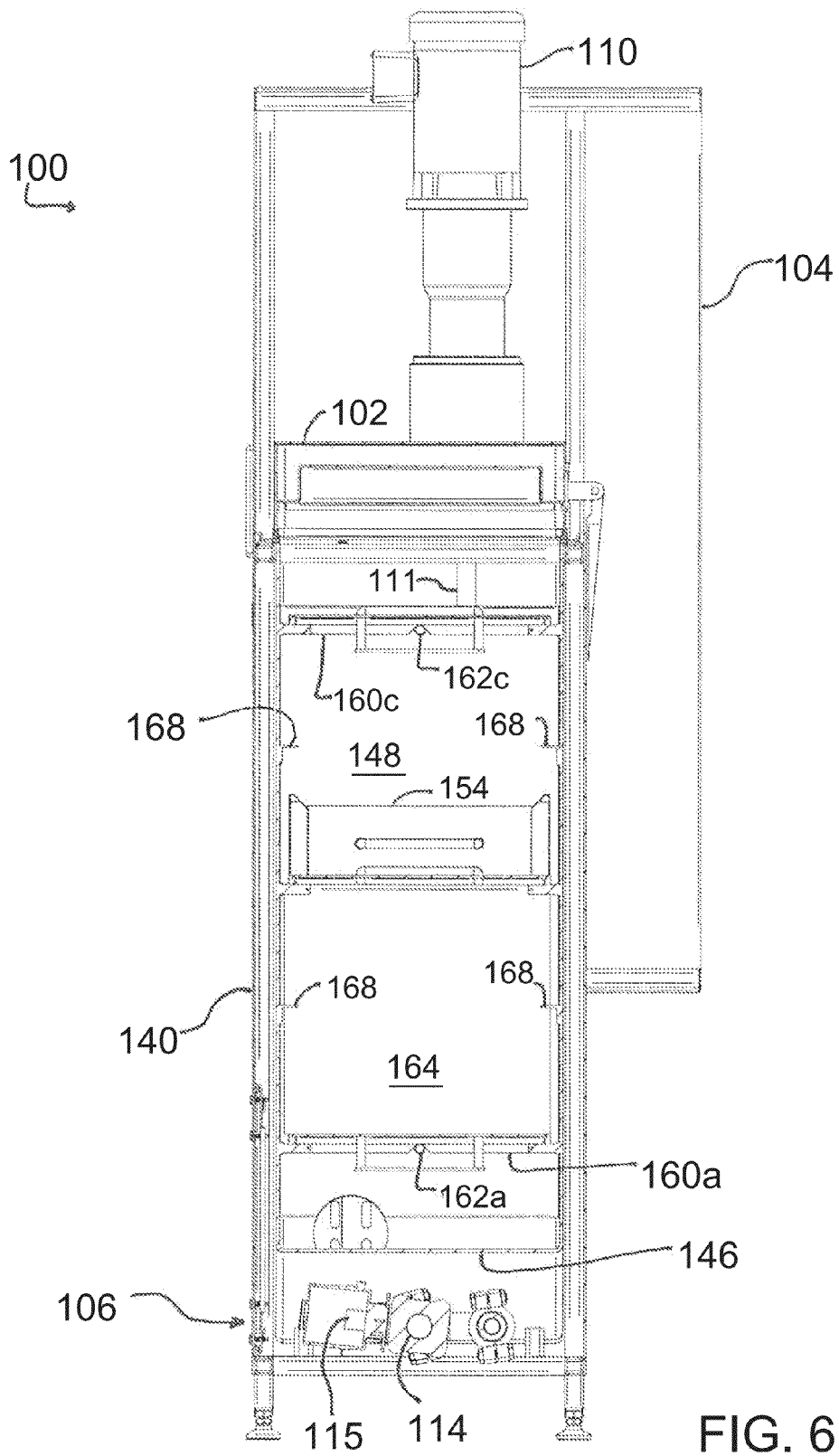
FIG. 6 is a side sectional view of the tissue digester depicted in FIG. 4 as taken along section B-B.
Figure 7:
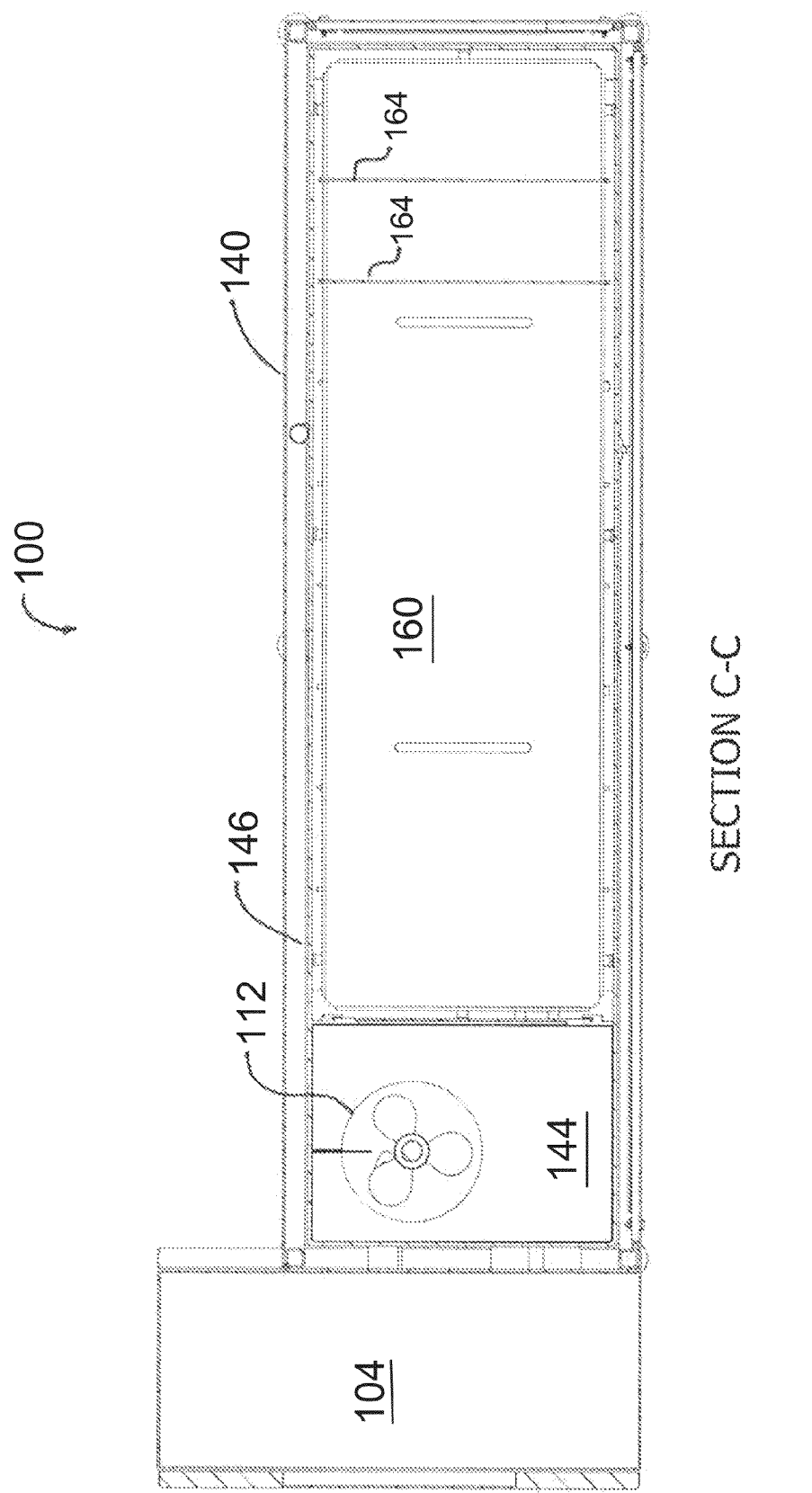
FIG. 7 is a top sectional view of the tissue digester depicted in FIG. 4 taken along line C-C.

Referring now to the sectional views of tissue digester 100 depicted in FIGS. 5 and 6, fluid pump 112 is connected to pump motor 110 by pump drive shaft 111. Pump drive shaft 111 extends through pump intake plenum 144, which during operation is at least partially filled with fluid. Pump 112, which may be a propeller (such as a ducted propeller), an impeller, or other type of pump as would be appreciated by one of ordinary skill in the art, circulates fluid within fluid vessel 146 in the directions depicted by fluid direction arrows 113.

Within the fluid vessel 146, wall 148 partially separates pump intake plenum 144 from tissue compartment 150, leaving a bottom area 146a of the fluid vessel 146 shared between the pump intake plenum 144 and tissue compartment 150, and an upper opening 156 permitting fluid communication between the pump intake plenum 144 and tissue compartment 150. In some embodiments, the wall 148 includes at least one intermediate opening 152. Intermediate opening 152 may be selectively inhibited (e.g., blocked) by baffle 154, such as by sliding baffle downward into an orientation that covers opening 152. Fluid flows readily through opening 152 when it is not blocked by baffle 154. When opening 152 is blocked by baffle 154, fluid is inhibited from flowing through opening 152. By selecting whether opening 152 is blocked or not blocked, the location(s) at which fluid enters the pump intake plenum 144 from tissue compartment 150 can be controlled. Opening 152 is sized to permit a flow of fluid from tissue compartment 150 to intake plenum 144 that is sufficient to avoid cavitation of pump 112. In the illustrated embodiment, opening 152 is typically open (not blocked by baffle 154) for low fluid level operation and typically blocked by baffle 154 for high fluid level operation.

Heater 157, which includes heating elements 158, is optionally included within fluid vessel 146 and used to heat the fluid during operation. As the fluid flows over heating elements 158 in direction 113, heating elements 158 of heater 157 transfer heat to the flowing fluid. In some embodiments heater 157 is an electric heater, while in other embodiments heater is powered by steam or other heating means as would be appreciated by one of ordinary skill in the art.

Located within tissue compartment 150 are one or more tissue separators, also referred to as partitions. The partitions include substantially horizontal platforms 160, which are labeled as platforms 160a, 160b, and 160c depending on their location within tissue compartment 150. Tissue digester 100 creates a net upward vertical flow through tissue compartment 150 (and through the sub-compartments), although in alternate embodiments tissue digester 100 creates a net downward vertical flow, or an alternating net upward and new downward flow through tissue compartment 150 (and through the sub-compartments). Platforms 160 are configured to permit fluid to flow vertically (for example, in the upward direction) within tissue compartment 150. In the depicted embodiment, the platforms 160 are screen-like structures that allow fluid to flow through each horizontal platform 160 while inhibiting undigested tissue of a minimum size or larger from moving through each horizontal platform 160. In certain embodiments, the platforms 160 are substantially horizontal panels having perforations to permit fluid flow vertically through the platforms 160.

Each horizontal platform 160 is supported by one or more platform supports 162, which are labeled as supports 162a, 162b, and 162c depending on their location within tissue compartment 150. In the illustrated embodiment platform supports 162 are depicted as being pegs that are received by complementary receptacles on horizontal platforms 160, which act together to help properly position platforms 160 horizontally and vertically within tissue compartment 150.

Optionally located within tissue compartment 150 are one or more vertically oriented partitions, for example, one or more vertical separators 164. One or more vertical separators 164 may be used to separate the interior of tissue compartment 150 into multiple smaller tissue holding sub-compartments and may be solid, may include one or more apertures, and may resemble screen-like structures. For illustration purposes, there are six (6) tissue holding sub-compartments (labeled 151a through 151f) depicted in FIG. 5. Each vertical separator 164 maintains its position during operation of tissue digester 100 to preserve the integrity of each of the smaller tissue holding sub-compartments. For example, each vertical separator 164 registers with a vertical wall engagement location 166 of platform support 162 to secure vertical separator 164 in position during the digestion process. Vertical separator supports 168 as best shown on FIG. 6, which in one embodiment resemble a comb-like structure, are optionally located within tissue compartment 150 to provide additional support for vertical separators 164, such as to provide additional horizontal support for vertical separators 160 and to inhibit horizontal movement of vertical separators 164 during digestion.

Platform supports 162 are grouped at various locations within tissue compartment 150 to support the horizontal platforms 160 at various locations within tissue compartment 150. For example, in the embodiment depicted in FIG. 5, the lowest of the three groupings of platform supports 162 are depicted as platform supports 162a and denote the lowest level at which a horizontal platform 160 may be supported within tissue compartment 150. Platform supports 162b are arranged to support a horizontal platform 160 at a second position within tissue compartment 150, and platform supports 162c are arranged to support a horizontal platform 160 at the uppermost position within tissue compartment 150. Alternate embodiments include a single location or dual locations for positioning the horizontal platforms (a single grouping or two groupings of platform supports 162), while other embodiments include four or more locations to meet various user needs.

Tissue digester 100 further includes operating valves 106 (see FIGS. 5 and 6), which may include a back flush valve, a discharge ball valve and/or hot and cold water valves. In the depicted embodiment, the operating valves 106 are located in the housing 140 below the fluid vessel 146. Access to operating valves 106 may be accomplished by removing one or more of the access panels 142.

A temperature sensor 170, which in one embodiment takes the form of a thermocouple, may be included to control the temperature of the fluid within fluid vessel 146.

A pressure sensor 172 may also be included to automatically control the fluid level within tissue digester 100.

Figure 8:
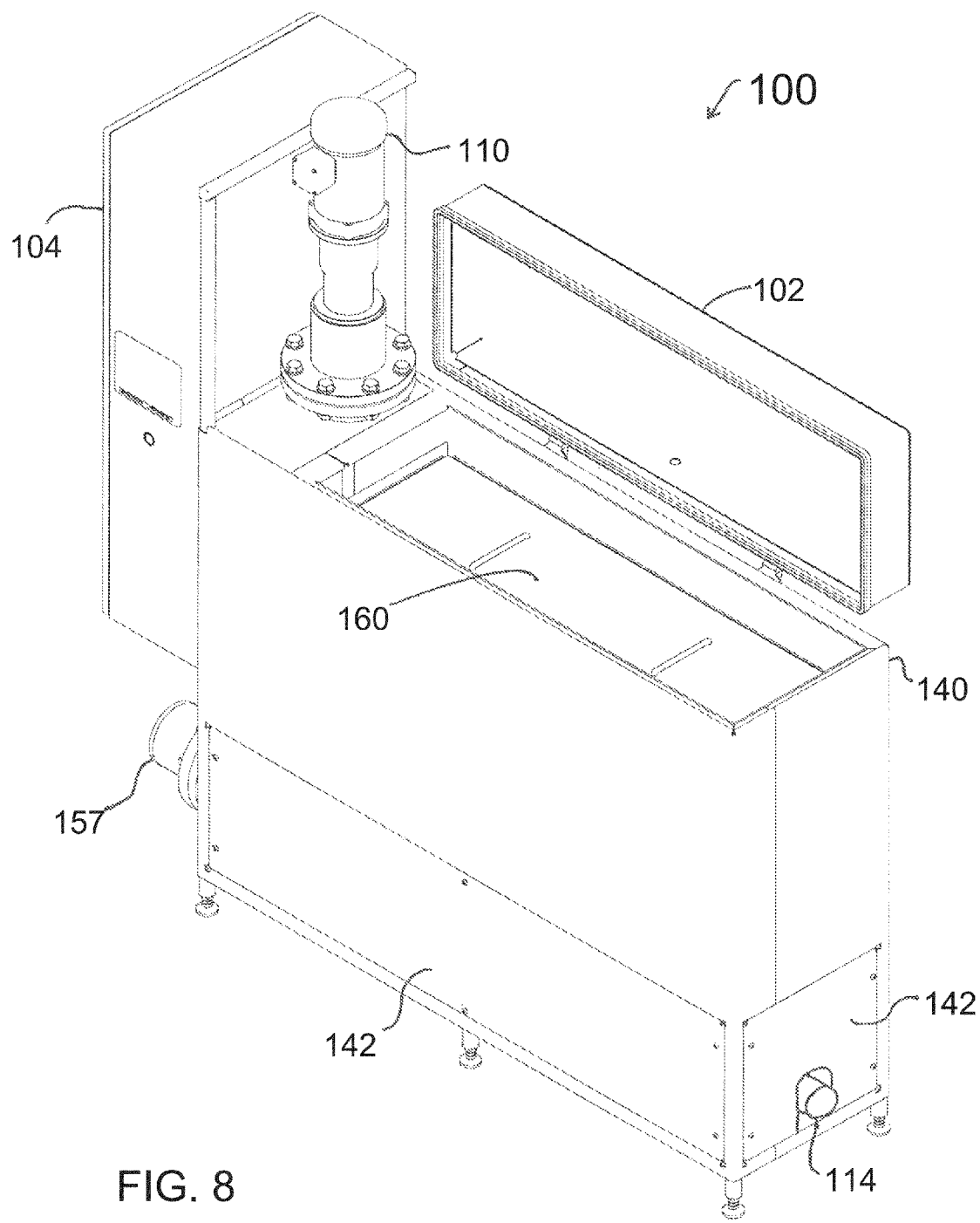
FIG. 8 is a perspective view of the tissue digester depicted in FIG. 1 with the lid open.
Figure 9:
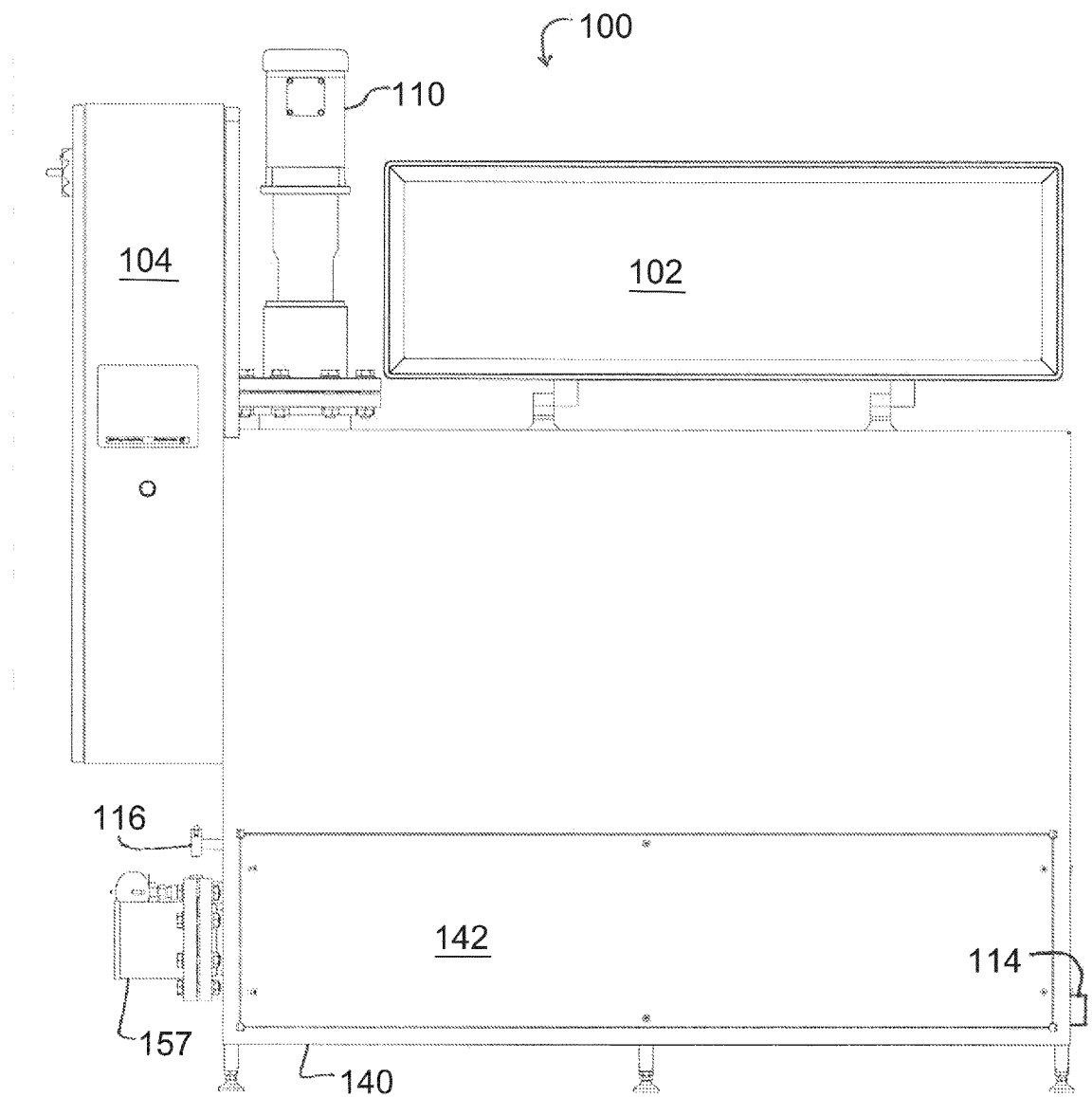
FIG. 9 is a front elevation view of the tissue digester depicted in FIG. 8.
Figure 10:
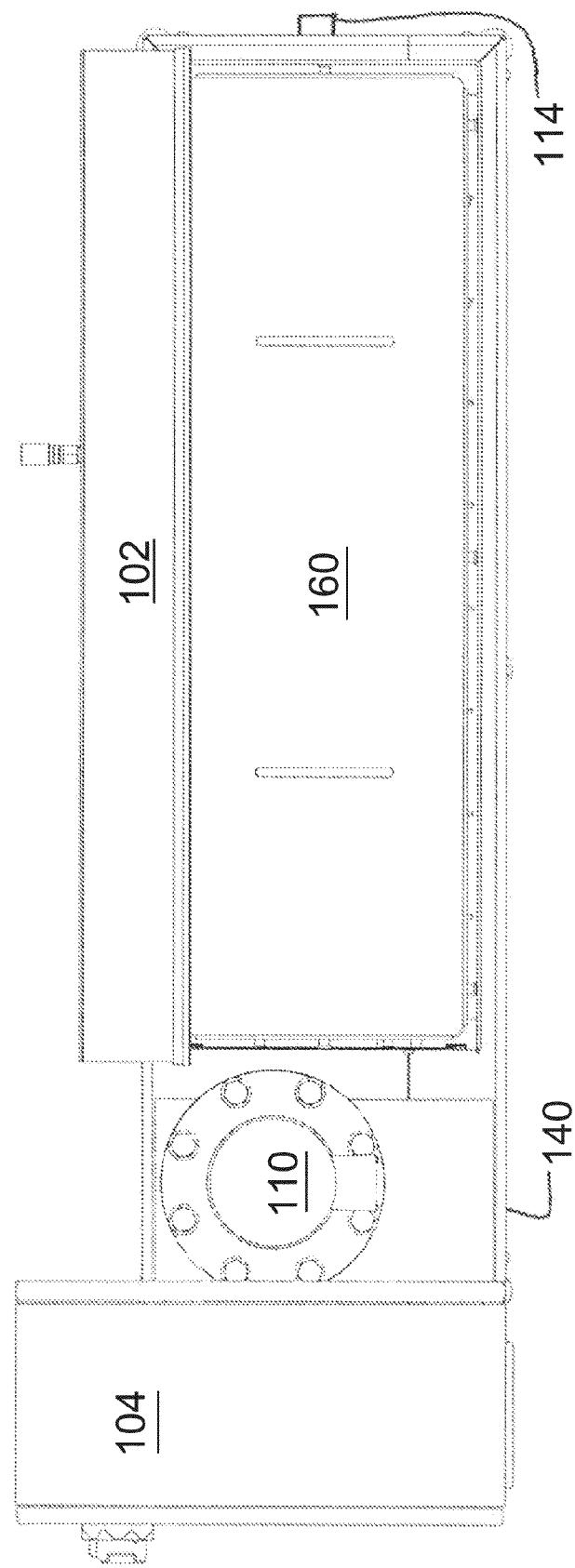
FIG. 10 is a top plan view of the tissue digester depicted in FIG. 8.
Figure 11:
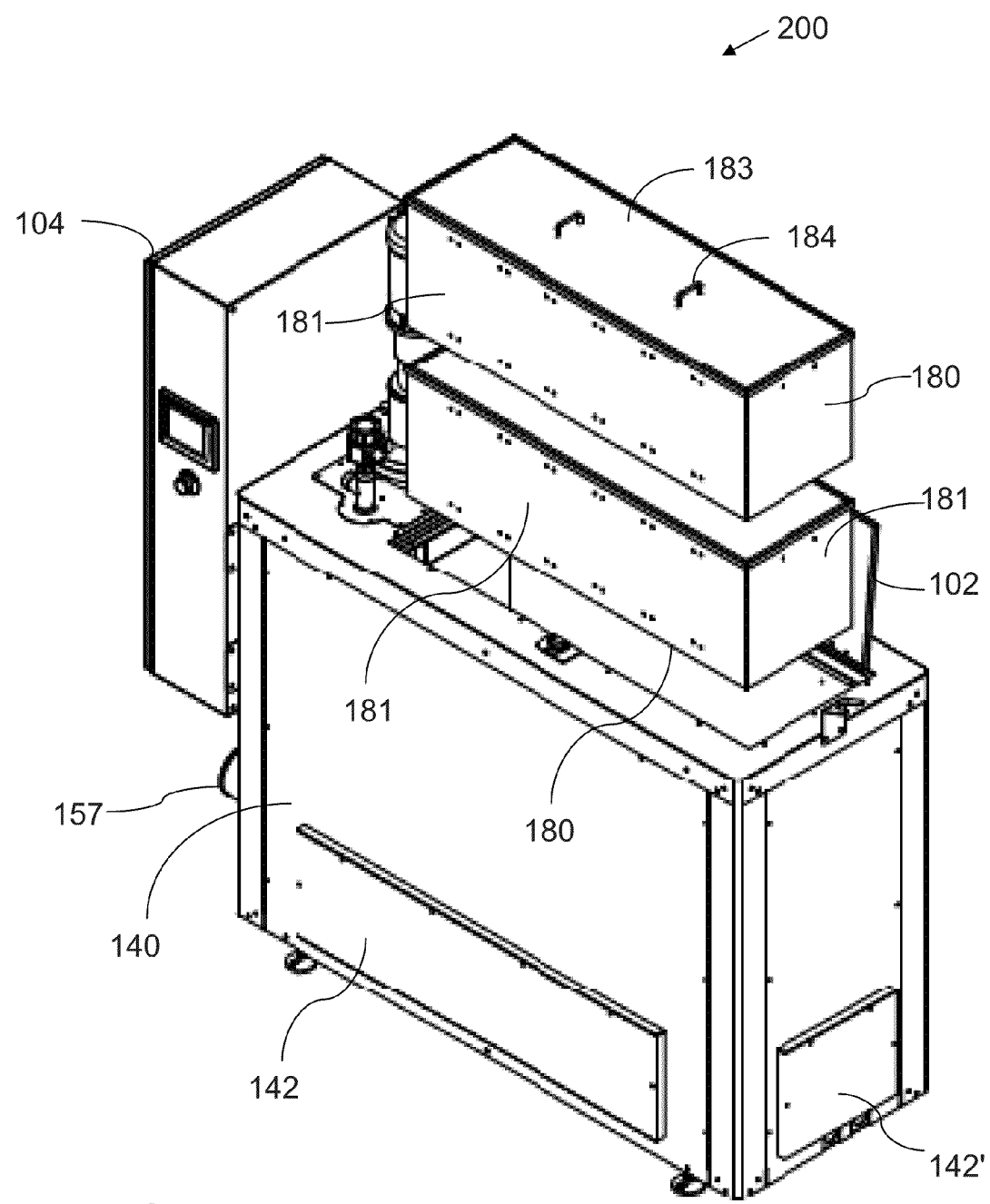
FIG. 11 is a perspective view of a tissue digester according to another embodiment of the present disclosure.
Figure 12:
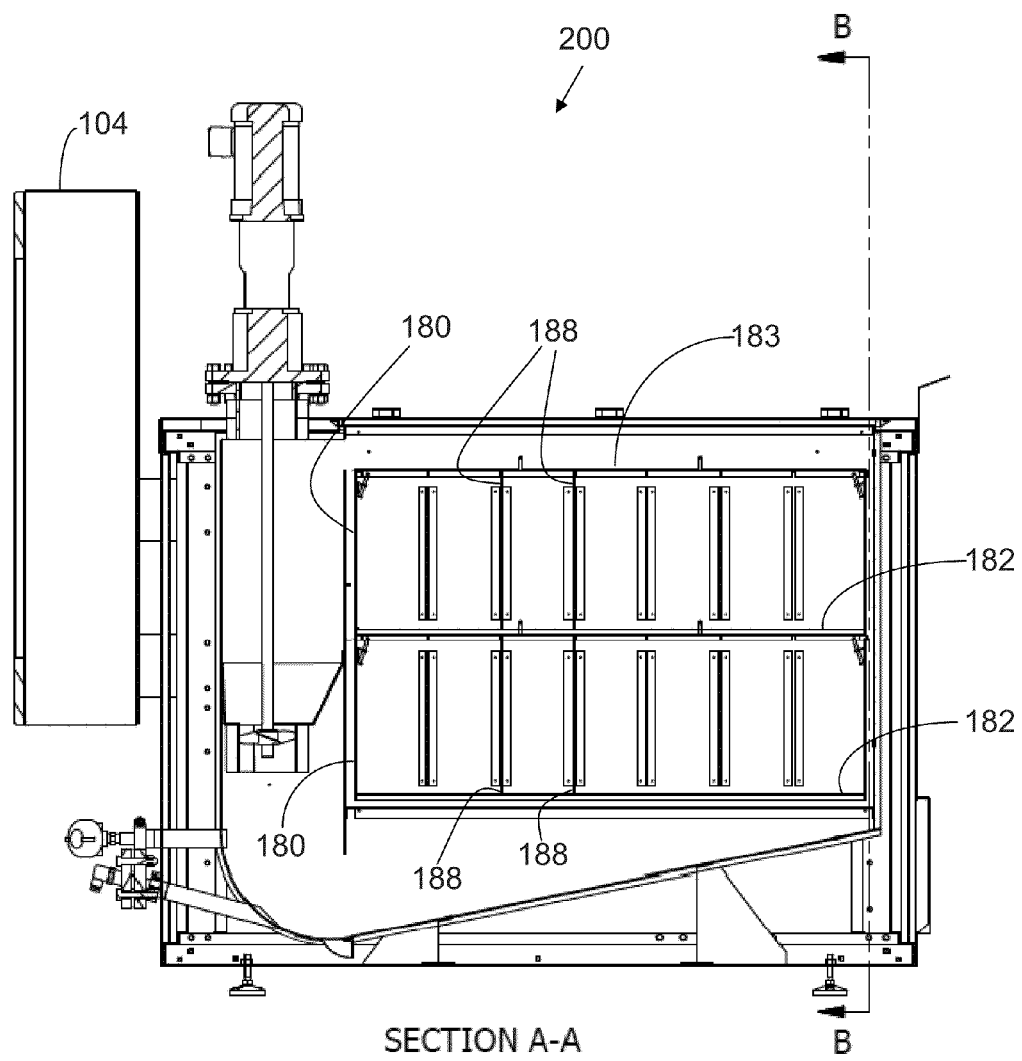
FIG. 12 is a front sectional view of the tissue digester depicted in FIG. 11.
Figure 13:
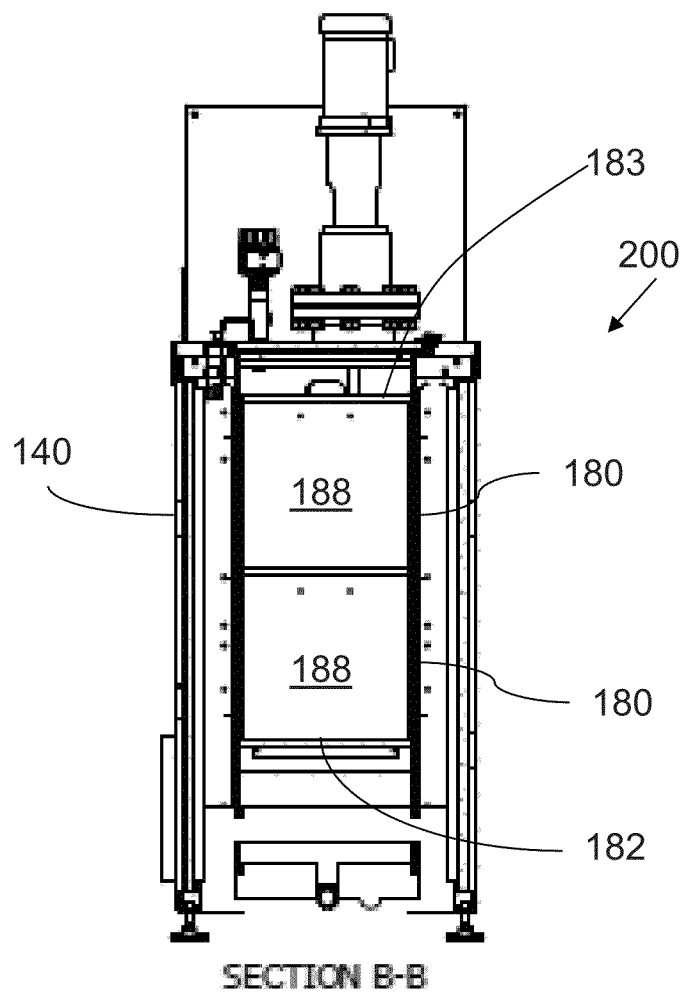
FIG. 13 is a side sectional view of the tissue digester depicted in FIG. 12 as taken along section B-B.
Figure 14:
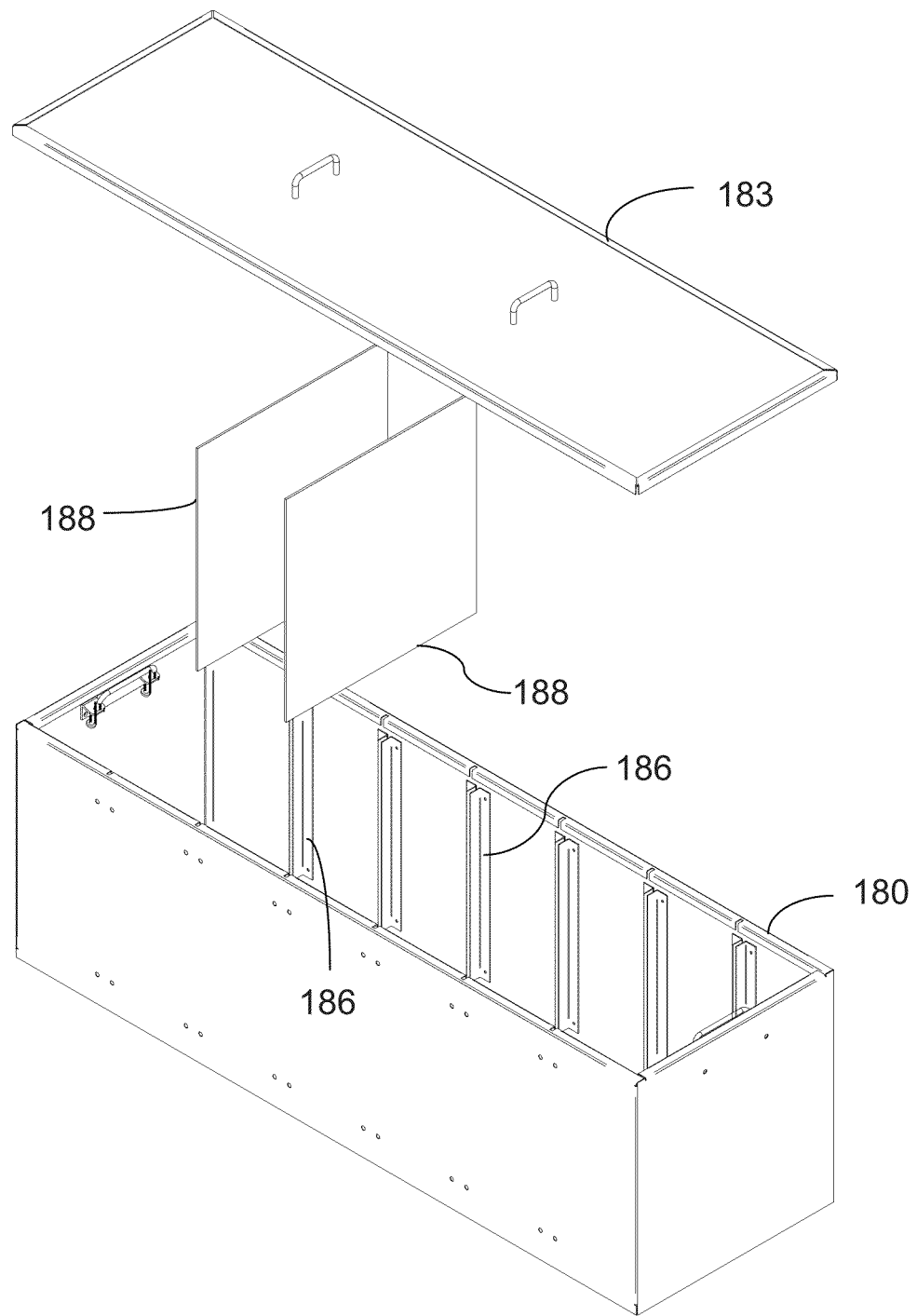
FIG. 14 is a perspective view of a basket, upper panel and baffle depicted in FIG. 11.

FIGS. 8-10 depict fluid digester 100 with lid 102 in the open position.

In operation, a user places a horizontal platform 160 within tissue compartment 150 to support tissue during the digestion process. Typically, at least one horizontal platform 160a will be placed at the lowest position within tissue compartment 150 and supported by platform supports 162a, so that tissue may be loaded at the lowest point within the tissue digester. This lowest level horizontal platform 160a typically remains in position and engaged with platform supports 162a unless removal of this lowest level platform 160a is required for cleaning. Other horizontal platforms (e.g., 160b and 160c) may also be placed in tissue compartment 150 as needed depending on the amount of animal tissue to be digested.

Tissue, for example animal mortalities, is initially weighed and loaded onto a horizontal platform 160, such as horizontal platform 160a. Vertical separators 164 may optionally be inserted to separate various groups of tissue. For example, if a number of household pets are being digested and the owners wish to keep the remains (i.e. ashes) of the individual pets, each pet can be loaded into an individual tissue digestion sub-compartment separated vertically by horizontal platforms 160 and separated horizontally by vertical separators 164.

If tissue is loaded onto horizontal platform 160a only, thereby requiring only the lower portion of tissue compartment 150 to be used for digestion, baffle 154 would be removed to allow the digestion fluid to pass from tissue compartment 150 to pump intake plenum 144 through opening 152. As such, the fluid flows into pump intake plenum 144 at an intermediate portion of plenum 144, and at lower level than if baffle 154 was positioned to cover opening 152, thereby facilitating the use of less digestive fluid than the amount required to run a fully loaded tissue compartment 150. Horizontal platform 160b would typically be used to hold tissue within tissue compartment 150 and inhibit the tissue from moving into intermediate opening 152, which could either block intermediate opening 152 or allow tissue to enter pump intake plenum 144 and potentially foul fluid pump 112.

If more tissue than can be positioned on a single platform is to be digested (i.e., there is more tissue than can be held by horizontal platform 160a), additional tissue may be loaded onto another platform, e.g. horizontal platform 160b. Horizontal platform 160c could also be positioned to hold tissue within tissue compartment 150. If required, additional vertical separators 164 could be installed between horizontal platforms 160b and 160c to separate various groupings of tissue.

When horizontal platform 160b is used to hold tissue, baffle 154 is typically positioned to block opening 152, which in the illustrated embodiment is accomplished by sliding baffle 154 from an upper open position to a lower closed position. In this configuration, the digestive fluid will flow upward until reaching upper opening 156, and then flow through upper opening 156 into pump intake plenum 144.

For bulk processing of large amounts of tissue, such as when processing a single large carcass or a number of carcasses that do not need to be segregated, the tissue is placed on horizontal platform 160a, baffle 154 is positioned to block opening 152, and horizontal platform 160c is placed in tissue compartment 150 to prevent tissue from entering pump intake plenum 144. A sufficient amount of digestive fluid is then added to permit the digestive fluid to flow from tissue compartment 150 to pump intake plenum 144 through upper opening 156 and the digestive cycle is activated.

As can be appreciated from the above discussion, tissue digester may be arranged in multiple configurations to accommodate multiple requirements and processing scenarios.

Once the tissue is loaded, alkali is added in proportion to the weight of the tissue to be processed. A dry chemical may be added or, in other embodiments, a pump may add liquid chemical into the fluid vessel 146. After addition of the alkali, lid 102 is closed and latched. The user may then activate the digestion process by using, for example, control box 104. An automatic safety latch to maintain lid 102 in a closed position may optionally be included to prevent the user from accidently opening the tissue digester during digestion, which could result in the user being sprayed with digesting fluid. Tissue digester 100 then introduces water (hot or cold) into fluid vessel 146 until the proper volume is reached, at which point pump 112 is activated to circulate digesting fluid within fluid vessel 146.

As best shown in FIG. 5, fluid is pulled downwardly from the pump intake plenum 144 through the pump 112, which in the illustrated embodiment is a ducted propeller, and is moved to the bottom area 146a of the fluid vessel 146. The fluid flows along the bottom 146a of fluid vessel 146, which is optionally curved in the illustrated embodiment, and upwardly along the angled bottom 146' to horizontal platform 160a. The fluid travels upwardly through the tissue compartment 150, passing through the screen-like platform 160a and all about the animal carcasses, lifting and moving the tissue around as the fluid circulates. The fluid then proceeds upwardly through platform 160b.

If baffle 154 is not positioned over intermediate opening 152, which typically corresponds to the situation where tissue is positioned on horizontal platform 160a only, the digestive fluid will flow out through intermediate opening 152 and back into the pump intake plenum 144.

If the baffle 154 is positioned over opening 152, which typically corresponds to the situation where tissue is positioned on horizontal platforms 160a and 160b, the fluid continues to flow upwardly through platform 160c. Once the fluid passes the uppermost horizontal platform 160, it flows out through upper opening 156 and back into the intake plenum 144. The fluid level within compartment 150 may be slightly higher on the end opposite the opening 152 or 156 due to the flow pattern generated by pump 112.

During operation, the fluid continues to circulate as the apparatus optionally heats the fluid (via heater 158), and once the fluid reaches its predetermined operating temperature (for example, 199 degrees Fahrenheit), the system continues for a specified time (for example, 16 hours after reaching the predetermined operating temperature) to digest the animal tissue. Once the digestion cycle is complete, an optional $CO_2$ injection may be used to reduce the pH level of the digestion fluid. The fluid may then be back-flushed through the discharge port 114 to dislodge bone powder residues that may have settled and accumulated in the discharge port 114. Once the discharge port 114 is clear, the drain valve 115 may be opened. A cold water co-flush may also be used to cool the wastewater while draining. Fluid discharge temperature is monitored and reduced during discharge via a discharge temperature sensor, such as thermocouple 117.

Once the fluid vessel 146 is drained, it may be filled with fresh water and the fresh water circulated to rinse out any effluent residues. After the fresh-water rinse, the drain may again be back-flushed then opened to discharge the rinse water. A spray ball (not shown) optionally disposed in the lid 102 may be activated to provide a final rinse to the bone residues. This final rinse water may also go to drain.

When the digestion process is complete, the optional automatic safety latch can release and a control screen on the control box 104 can indicate to the user that the lid 102 may be safely opened. A hand spray nozzle (similar to a domestic kitchen sink sprayer) is optionally available for additional rinsing as needed. The bone remains may then be removed from within the housing.

Although the illustrated embodiments depict a single intermediate opening 152 in wall 148, alternate embodiments include two or more intermediate openings 152 in wall 148. Each intermediate opening 152 may be selectively blocked by a baffle 154, such as by sliding baffle downward into an orientation that covers opening 152. When tissue compartment 150 is at least partially filled with fluid to digest tissue, the fluid level will be at or above one or more openings 152. Fluid will flow readily through the openings 152 that are not blocked by a baffle 154, and fluid will be inhibited from flowing through the openings 154 that are blocked by a baffle 154. By selecting which openings 152 are blocked and which are not blocked, the location at which fluid enters the pump intake plenum 144 from tissue compartment 150 can be controlled. Each intermediate opening 152 is typically sized to permit a flow of fluid from tissue compartment 150 to intake plenum 144 that is sufficient to avoid cavitation of pump 112.

In situations where tissue digester 100 is to be filled to its maximum fluid capacity, which corresponds to the fluid level reaching upper opening 156, each intermediate opening 152 will typically be blocked by its respective baffle 154. In this configuration, the digestive fluid will flow upward until reaching upper opening 156, and then flow through upper opening 156 into pump intake plenum 144.

If less than the maximum fluid level is desired, the opening 152 corresponding to the desired fluid level in tissue compartment 150 will typically remain unblocked by a baffle 154, while the openings 152 located below the fluid level in tissue compartment 150 are typically covered by their respective baffle(s) 154. This configuration encourages upward movement of the fluid in tissue compartment 150 until reaching the maximum fluid level, at which point the fluid travels through an unblocked opening 152 and into pump intake plenum 144.

This upward movement tends to lift the tissue off the horizontal platforms 160, helping the tissue move and encouraging rapid and complete digestion.

Depicted in FIGS. 11-16 is a tissue digester 200 according to another embodiment of the present disclosure. Various components of tissue digester 200 are the same as corresponding components of tissue digester 100 except as otherwise indicated or illustrated, similar components being reflected by use of similar reference numbers or by similar depiction in the figures. In place of (or, in some embodiments, in addition to) the internal partitioning and baffling system located within tissue compartment 150 of tissue digester 100, tissue digester 200 includes one or more baskets 180. Each basket 180 includes side panels 181 and a bottom panel 182 (which is optionally removable). An upper panel 183 serves as a removable upper lid for basket 180. Basket(s) 180 and upper panel 183 optionally include handles 184 to assist the user in handling upper panel 183.

Figure 15:
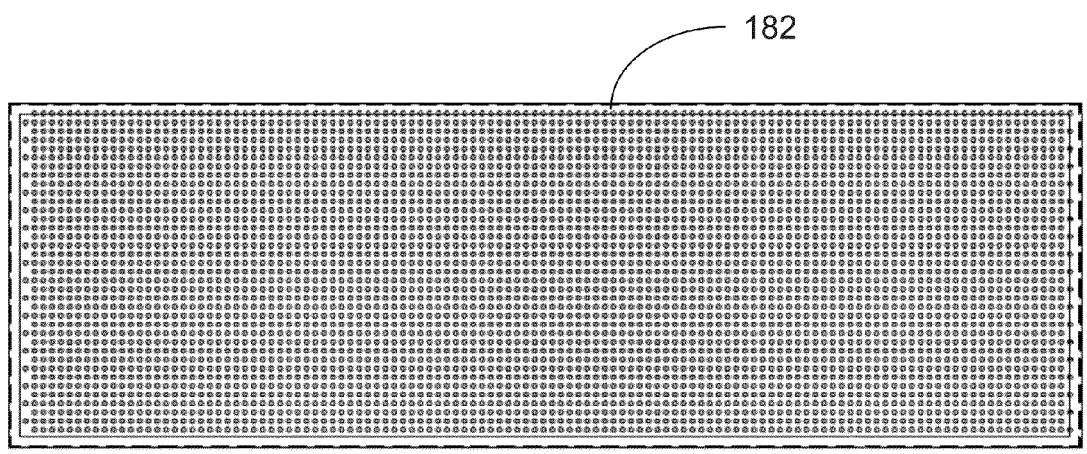
FIG. 15 is a plan view of a lower panel with perforations according to one embodiment of the present disclosure.
Figure 16:
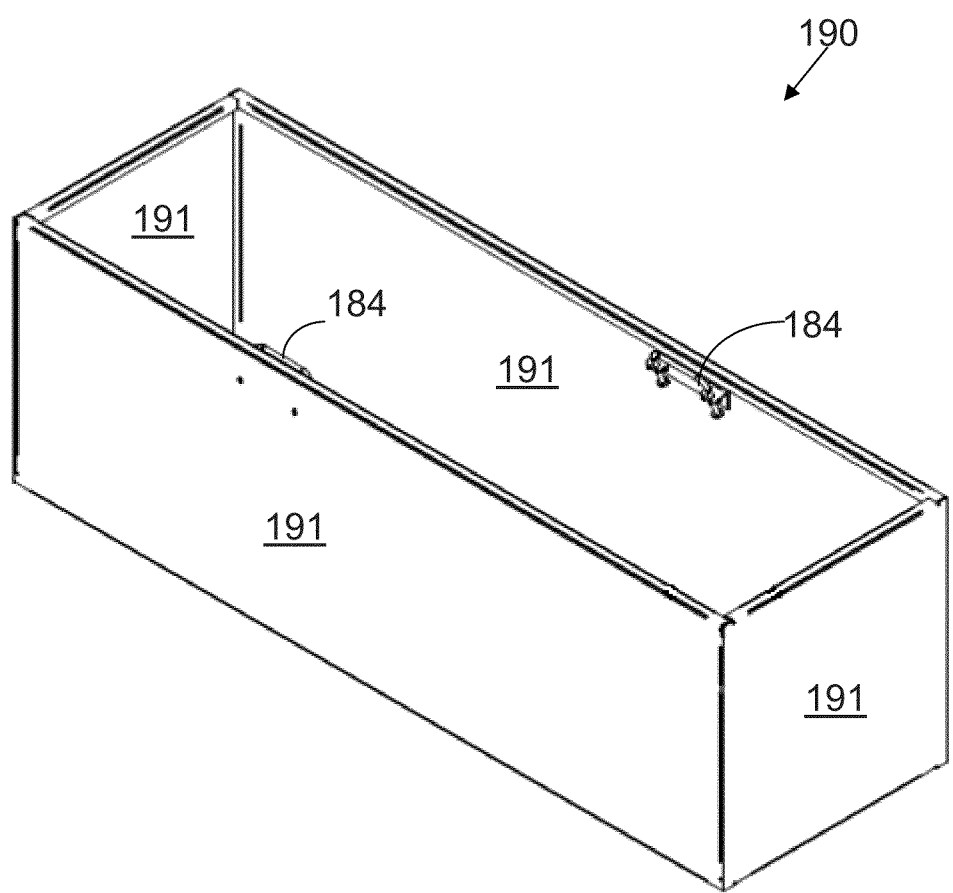
FIG. 16 is a perspective view of a basket extension according to one embodiment of the present disclosure.

Panels 181, 182, and 183 may be solid or perforated with one or more apertures; however, in one particular embodiment side panels 181 are solid while bottom panel 182 and upper panel 183 are perforated with multiple apertures to form screen-like structures. One feature of the solid side panels 181 is their tendency to channel digestive fluid vertically through basket 180. In one embodiment the perforations in the bottom panel 182 and/or upper panel 183 are ⅜ inches in diameter, although in alternate embodiments the diameter of the perforations are approximately ⅛ inch (which may have advantages in retaining smaller pieces of tissue within the basket while increasing the uniformity of the vertical flow throughout basket 180 and throughout each sub-compartment). Depicted in FIG. 15 is an example embodiment of a bottom panel 182 with perforations sized and distributed to create a uniform vertical flow of fluid through basket 180, and through the sub-compartments located between side panels 181 in basket 180 if utilized. In at least one embodiment, the upper panel 183 includes perforations as depicted in FIG. 15.

Tissue digester 200 also includes a fluid pump 112' with a propeller that has been extended downward a few inches (e.g., 2 inches) from the position of the propeller in fluid pump 112 to increase the efficiency of fluid pump 112'. In one particular embodiment, the propeller is located below the propeller's ducting.

One or more tissue separators (e.g., baffles 188) may be selectively inserted into the interior portion each basket 180. In some embodiments, an attachment mechanism, for example, one or more channels 186, are used to position baffles 118 within basket 180. When positioned within the interior of a basket 180, baffle(s) 188 form individual compartments into which tissue (for example, animal carcasses) may be placed for digestion.

In some embodiments, a basket extension (sometimes referred to as a filler box) may be utilized to provide upward extensions of side panels 181. For example, in the embodiment depicted in FIG. 16, basket extension 190 is similar to basket 180 and includes four side panels 191 (which may be similar to side panels 181), but basket extension 190 does not include a bottom panel. In some embodiments the basket extension 190 includes mechanisms (for example, channels similar to channels 186) for attaching baffles, while other embodiments (such as the depicted embodiment) do not include such mechanisms.

Use of baskets 180 in tissue digester 200 allow the user to create a plurality of configurations for digesting tissue. For example, one configuration is formed by placing a single basket 180, which may have been further compartmentalized with one or more baffles 188, in the bottom portion of tissue digester 200. After loading the tissue into basket 180 (which may be accomplished prior to or after inserting basket 180 into tissue digester 200) the user may place an upper panel 183 atop basket 180 and open baffle 154 in wall 148. After positioning upper panel 183 atop basket 180, the user may simply place solid (usually in powder form) alkali on the top of the upper panel 183 prior to closing tissue digester 200 and initiating the digestion cycle. This configuration digests a reduced amount of tissue with a reduced amount of fluid that circulates through basket 180, through intermediate opening 152, and back to fluid pump 112, although in other embodiments the fluid can circulate in the opposite direction.

Another configuration is formed by the user placing two baskets 180, either or both of which may have been further compartmentalized with one or more baffles 188, into tissue digester 200. After placing tissue within the lower basket 180 (which may occur before or after loading the lower basket 180 into tissue digester 200), the upper basket 180 is placed on top of (or connected to) the lower basket 180. The bottom panel 182 of the upper basket 180 will separate the bottom basket 180 from the upper basket 180 (acting as an upper panel for the lower basket 180) and inhibits tissue from migrating between the two baskets 180. Nevertheless, alternate embodiments include placement of an upper panel 183 on the lower basket 180 prior to placing the upper basket 180 atop the lower basket 180. After loading tissue into the upper basket 180, an upper panel 183 may be positioned over the upper basket 180 to inhibit tissue from migrating out the top of the upper basket 180. When utilizing baskets with solid side panels 181, it is possible to leave the intermediate opening 152 unblocked by baffle 154 without significantly affecting the performance of tissue digester 200 since, at least in part, the solid side panels 181 channel a sufficient amount of the digestive fluid through both baskets 180 to effectively digest the tissue within both baskets. This configuration digests an increased amount of tissue over the previously described configuration with fluid circulating through lower basket 180, upper basket 180, through upper opening 156 (and possibly also through intermediate opening 152), and back to fluid pump 112, although in other embodiments the fluid can circulate in the opposite direction.

Still another configuration is formed by the user placing a single basket 180, which may have been further compartmentalized with one or more baffles 188, in the bottom portion of tissue digester 200. Either before or after placing the single basket 180 within the tissue digester to hundred, a basket extension may be placed on (or connected to) the upper portion of basket 180, effectively extending the side panels 181 of the basket 180 upward. Since the effective height basket 180 is extended by using the basket extension, large animals may be placed into basket 180. An upper panel 183 may be placed over the top of the basket extension prior to beginning a digestion cycle. In this configuration it is possible to leave the intermediate opening 152 unblocked by baffle 154 without significantly affecting the performance of tissue digester 200. This configuration can digest larger animals than the previously described configurations with fluid circulating through lower basket 180, basket extension.

While digesting tissue, advantages may be realized by moving digestive fluid slowly through tissue digester 100 or 200 to preserve the integrity of the bones during the digestive cycle. If too rapid a circulation is utilized, the bones will disintegrate leaving nothing to return to the owner of the deceased animal. In one example embodiment, a flow rate of approximately 500 gallons per minute produces a gentle enough flow to preserve the integrity of the bones. Additional advantages may be realized by flowing digestive fluid upward past the tissue as this assists in moving the tissue and increasing the rate of digestion.

In still further embodiments, a porous bag (such as one constructed of a non-digestible material such as nylon) may be utilized to further compartmentalize tissue digester 100 or 200.

While illustrated examples, representative embodiments and specific forms of the invention have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. Exemplary embodiments have been shown and described, and all changes and modifications that come within the spirit of the invention are desired to be protected.

What is claimed is:

1. A method for digesting tissue, comprising the acts of:
    dividing a tissue digesting vessel configured and adapted to retain tissue during digestion into at least two separate tissue digesting compartments, the at least two separate tissue digesting compartments being configured and adapted to retain tissue during digestion;
    loading tissue within each of the at least two tissue digesting compartments;
    digesting the tissue placed within each of the at least two tissue digesting compartments;
    retaining undigested portions of the tissue within the compartment in which the tissue was placed.

2. The method of claim 1, wherein said forming includes positioning at least one separator within the interior of the tissue digesting vessel, the separator separating the at least two tissue digesting compartments.

3. The method of claim 2, wherein said forming includes orienting the at least one separator in a horizontal orientation within the tissue digesting vessel.

4. The method of claim 2, wherein said forming includes orienting at least one separator in a vertical orientation within the tissue digesting vessel.

5. The method of claim 4, wherein said forming includes orienting the at least one vertically oriented separator between two horizontally oriented separators within the tissue digesting vessel.

6. The method of claim 1, comprising:
    changing the size of at least one tissue digesting compartment by removing a separator from a first mounting location and mounting the separator at a second mounting location spaced from the first mounting location.

7. The method of claim 6, wherein said changing the size of at least one tissue digesting compartment includes moving at least one separator.

8. The method of claim 1, comprising:
    changing the number of tissue digesting compartments within the tissue digesting vessel.

9. The method of claim 8, wherein said changing the number of tissue digesting compartments includes moving at least one separator.

10. The method of claim 1, wherein said forming includes forming at least three tissue digesting compartments within a tissue digesting vessel.

11. The method of claim 1, comprising:
    placing the tissue digesting vessel into a first chamber of a fluid circulation device, the first chamber being separated from a second chamber by a wall; and
    wherein said digesting includes circulating digesting fluid in an upward direction through the first chamber while simultaneously circulating fluid in a downward direction through the second chamber.

12. The method of claim 11, wherein said digesting includes circulating digesting fluid through an intermediate pump intake in the wall separating the first and second chambers to reduce the amount of fluid required to circulate fluid in the fluid circulating device.

13. The method of claim 2,
    wherein the tissue digesting vessel includes a plurality of separator support members, and
    wherein said forming at least two tissue digesting compartments within a tissue digesting vessel includes engaging one or more separator support members of the tissue digesting vessel with one or more separators.

14. The method of claim 13, wherein said forming at least two tissue digesting compartments within a tissue digesting vessel includes orienting the one or more separators in a generally horizontal orientation.

15. The method of claim 13,
    wherein the at least one separator includes one or more wall engagement members, and
    wherein said forming at least two tissue digesting compartments within a tissue digesting vessel includes engaging one or more wall engagement members with one or more walls.

16. The method of claim 15, wherein said forming at least two tissue digesting compartments within a tissue digesting vessel includes
    orienting the one or more separators in a generally horizontal orientation and
    orienting the one or more walls in a generally vertical orientation.

17. The method of claim 16, comprising:
    facilitating the flow of fluid through the one or more generally horizontal separators;
    inhibiting the flow of tissue through the one or more generally horizontal separators; and
    inhibiting the flow of fluid and tissue through the one or more walls.

18. The method of claim 2,
    wherein the tissue digesting vessel includes at least one first separator support member and at least one second separator support member, and
    wherein said forming at least two tissue digesting compartments within a tissue digesting vessel includes
        disengaging one or more separators from the at least one first separator support member of the tissue digesting vessel, and
        engaging the one or more separators with the at least one second separator support member of the tissue digesting vessel.

19. The method of claim 1, comprising:
    loading the tissue digesting vessel into a larger tissue digesting container.

20. The method of claim 8, wherein said changing the number of tissue digesting compartments includes mounting at least one separator to the tissue digesting vessel.

21. A method for digesting tissue, comprising the acts of:
    forming at least two tissue digesting sub-compartments within a larger tissue digesting compartment by mounting at least one partition within the interior of the larger tissue digesting compartment;
    loading tissue into the two tissue digesting sub-compartments;
    digesting the tissue loaded into the two tissue digesting sub-compartments; and
    retaining undigested portions of the tissue within the two tissue digesting sub-compartments into which the tissue was placed.

22. The method of claim 21, wherein said digesting includes circulating digesting fluid through the sub-compartment.

23. The method of claim 22, wherein said circulating digesting fluid through the sub-compartment includes inhibiting the flow of digesting fluid in one direction while facilitating the flow of digesting fluid in another direction.

24. The method of claim 23, wherein the one direction and the another directions are perpendicular to one another.

25. The method of claim 22, wherein said circulating digesting fluid through the sub-compartment includes inhibiting the horizontal flow of digesting fluid while facilitating the vertical flow of digesting fluid.

26. The method of claim 22, wherein said circulating includes moving digesting fluid to a first pump through a pump intake.

27. The method of claim 26, wherein said moving digesting fluid to a pump through a first pump intake requires a first amount of digestion fluid, and said method comprising:
moving digesting fluid to the pump through an intermediate opening, wherein said moving digesting fluid to the pump through an intermediate opening requires a second amount of digestion fluid, the second amount of digestion fluid being less than the first amount.

28. The method of claim 21, wherein said forming at least two tissue digesting sub-compartments includes
disengaging the at least one partition from a first partition mounting location within the tissue digesting compartment, and
engaging the at least one partition with a second partition mounting location within the tissue digesting compartment.

29. The method of claim 21, comprising:
loading the tissue digesting compartment into a disuse digesting vessel before said digesting.

30. The method of claim 1, wherein said forming includes mounting at least one separator to an interior wall of the tissue digesting vessel.

* * * * *